(12) United States Patent
Su

(10) Patent No.: US 6,791,533 B2
(45) Date of Patent: Sep. 14, 2004

(54) SEAMLESS MOUSE

(75) Inventor: Chih Wen Su, Chung Ho (TW)

(73) Assignee: Behavior Tech Computer Corporation, Taipei (TW)

( * ) Notice: Subject to any disclaimer, the term of this patent is extended or adjusted under 35 U.S.C. 154(b) by 281 days.

(21) Appl. No.: 09/893,285

(22) Filed: Jun. 28, 2001

(65) Prior Publication Data

US 2003/0001819 A1 Jan. 2, 2003

(51) Int. Cl.[7] ................................................. G09G 5/08
(52) U.S. Cl. ....................................... 345/163; 345/167
(58) Field of Search ................................ 345/163, 164, 345/165, 166, 167

(56) References Cited

U.S. PATENT DOCUMENTS

| | | | | |
|---|---|---|---|---|
| 5,828,364 | A | * 10/1998 | Siddiqui | ...................... 345/163 |
| 6,373,470 | B1 | * 4/2002 | Andre et al. | ................ 345/166 |
| 2002/0118174 | A1 | * 8/2002 | Rodgers | |
| 2002/0135562 | A1 | * 9/2002 | Wu | |
| 2002/0140676 | A1 | * 10/2002 | Kao | |

OTHER PUBLICATIONS

Kao, Pub. No.: US 2002/0140676, Oct. 3, 2002.*
Rodgers, Pub. No.; US 2002/0118174 A1, Aug. 29, 2002.*
Wu, Pub. No.: US 2002/0135562 A1, Sep. 26, 2002.*

* cited by examiner

*Primary Examiner*—Regina Liang
*Assistant Examiner*—Jennifer T. Nguyen
(74) *Attorney, Agent, or Firm*—Rosenberg, Klein & Lee

(57) ABSTRACT

A seamless mouse comprising a base, with an embedding unit at the rear of the base, a coupling unit in it, a pair of activating troughs near its front, a touch switch in the activating trough, to receive command from the touch operation; and a top cover, at the rear of the top cover and opposite the embedding unit being a joining pin to insert into the embedding unit for fastening purpose, inside it and opposite the coupling unit being a coupling post to couple with the coupling unit, at its front and opposite the activating trough being a driving lever, and extending from the top cover itself being the formation of at least one push key. When the top cover is assembled to the base, the joining pin is fastened to the embedding unit, the coupling post is fastened to the coupling unit. When the push key is pressed, the driving lever activates the touch switch in the activating trough, to serve the function of the mouse. Furthermore, the mouse appears to have no seam, and its radial push key will have better control and operation performance.

1 Claim, 3 Drawing Sheets

SEAMLESS MOUSE

BACKGROUND OF THE INVENTION

1. Field of the Invention

The invention relates to a seamless mouse, particularly to a mouse which top cover involves the information of radial push keys, so that there is no more clearance between the push key and the top cover, meanwhile, its radial key may have better control and performance.

2. Background of the Invention

The conventional mouse comes in two types, either two keys or three keys. Either mouse has its keys and its top cover separately produced before they are assembled. Therefore, there shall be some joining seam existing between the push key and the top cover. Furthermore, it has limited length of push key, so the user does not have a good feeling and sense of control. Accordingly, the existing weakness needs improvement.

BRIEF DESCRIPTION OF THE INVENTION

The primary objective of this invention is to provide a seamless mouse, which comprises a base. At the back of the base is an embedding unit, inside it is a coupling unit, at its front is a pair of activating troughs, inside the activating trough is a touch switch. The mouse further comprises a top cover. At the rear of the top cover and opposite the embedding unit is a joining pin to insert into the embedding unit for fastening purpose, inside it and opposite the coupling unit is a coupling post to couple with the coupling unit, at its front and opposite the activating trough is a driving lever, and extending forward from the top cover itself is the formation of at least one push key. When the top cover is assembled to the base, the joining pin is fastened to the embedding unit, the coupling post fastened to the coupling unit. When the push key is pressed, the driving lever touches the touch switch in the activating trough, to serve the function of the mouse. Furthermore, its appearance involves no seam showing the push keys, and its radial push key will have better control and performance.

BRIEF DESCRIPTION OF DRAWINGS

The drawings of preferred embodiments of this invention are described in following details to enable better understanding.

DETAILED DESCRIPTION OF THE EMBODIMENTS

Figure 1:
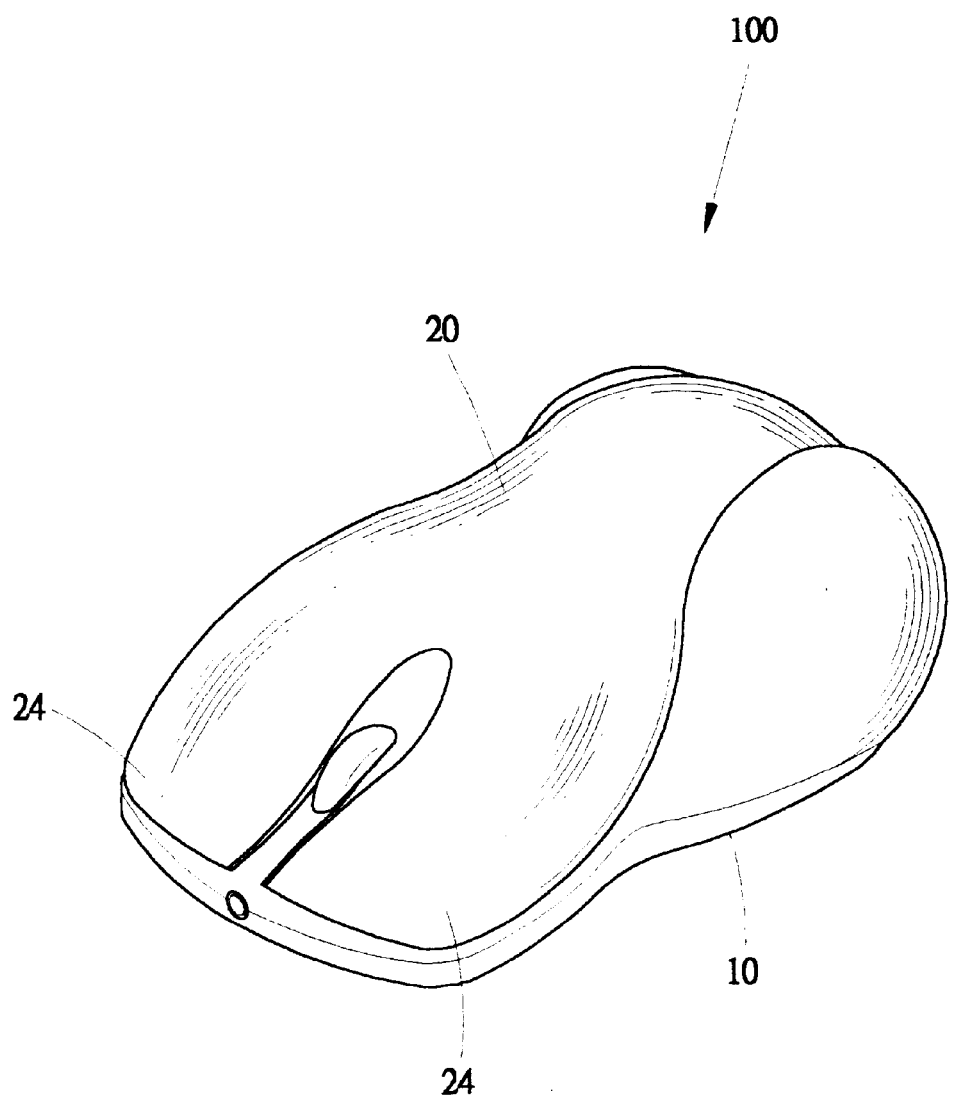
FIG. 1 is a perspective view of a seamless mouse of the present invention.
Figure 2:
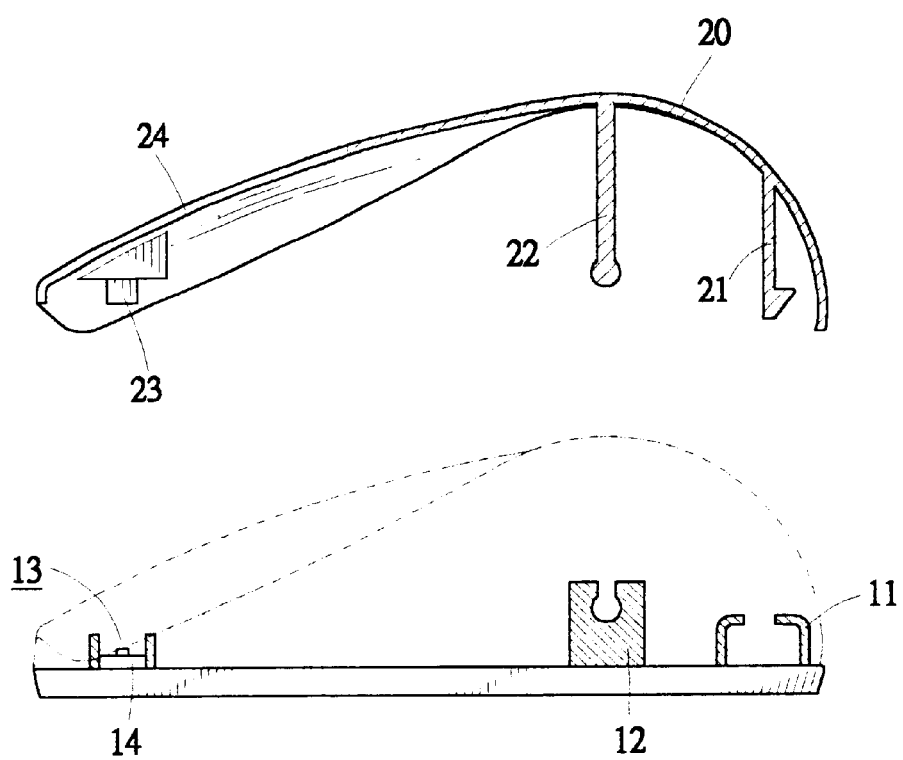
FIG. 2 is a section view of seamless mouse of the invention.
Figure 3:
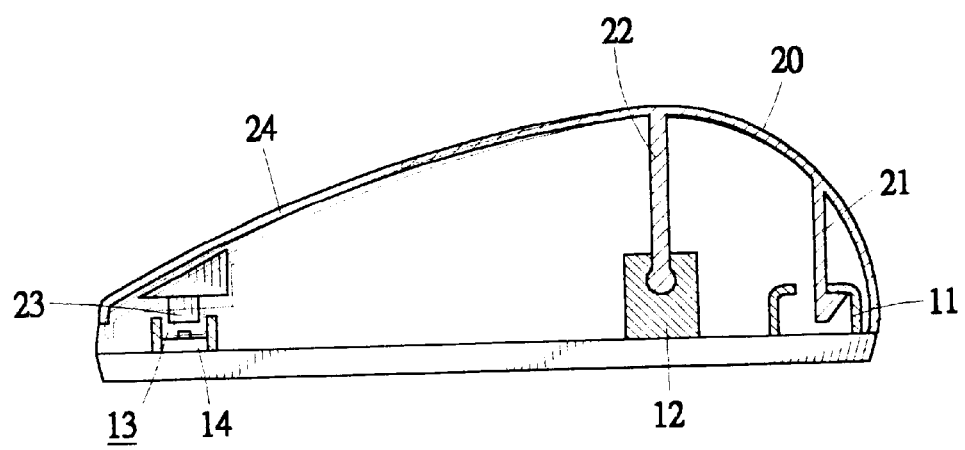
FIG. 3 is a section view of the invention showing the construction and assembly of the base and the top cover.

As shown in FIGS. 1 and 2, a seamless mouse 100 of the invention comprises a base 10, with an embedding unit 11 at the back of the base 10, a coupling unit 12 at its center, a pair of activating troughs 13 at its front, and a touch switch 14 in the activating trough 13 to receive the command from the touch operation; a top cover 20, at the rear of the top cover 20 and opposite the embedding unit 11 is a joining key 21 to insert in the embedding unit 11, at the middle and opposite the coupling unit 12 is a coupling post 22 to mount onto the coupling unit 12, with a driving lever 23 at its front and corresponding to the activating trough 13, the top cover 20 itself extending forward to form at least one push key 24. When the top cover 20 is assembled to the base 10, a joining key 21 is joined with the embedding unit 11 and the coupling post 22 is coupled to the coupling unit 12. When the push key 24 is pressed, the driving lever 23 activates the touch switch 14 in the activating trough 13.

As shown in FIG. 1, the key 24 of this seamless mouse 100 is an extension from the top cover 10 itself, forming a radial key, thus there is no need a clearance between a conventional push key and the top cover itself. Therefore, this invention is not only capable of achieving the functions of a mouse, but it involves no seam, so it has an appearance with a sense of value. Particularly, the radial push key can have better control and operation performance.

What is claimed is:

1. A seamless mouse, comprising:

a base, the base having (a) an embedding unit at a rear portion thereof, (b) a coupling unit disposed at an interior portion of the base, and (c) a pair of activating troughs disposed at a front portion of the base, each of the activating troughs having a touch switch disposed therein; and a top cover overlaying the base and being positionally affixed thereto, the top cover having (a) a joining pin extending downwardly from a rear underside portion thereof and engaged to the embedding unit, (b) a coupling post extending downwardly from an interior underside surface of a first portion of the top cover, the coupling post being coupled to the coupling unit, and (c) a flexible second portion of the top cover cantilevered from the first portion, the flexible second portion having a pair of push key regions defined by a front portion thereof, each of the push key regions having a driving lever extending downwardly from an underside area of the flexible second portion of the top cover corresponding to a respective push key region and in alignment with a respective touch switch;

wherein each push key region of the top cover is flexed to displace a respective driving lever into contact with the touch switch aligned therewith and returned to an unflexed state by a bias force of the top cover.

* * * * *